US012333546B2

(12) United States Patent
Merz et al.

(10) Patent No.: US 12,333,546 B2
(45) Date of Patent: *Jun. 17, 2025

(54) SYSTEM AND METHODS FOR ENHANCED APPROVAL OF A PAYMENT TRANSACTION

(71) Applicant: MASTERCARD INTERNATIONAL INCORPORATED, Purchase, NY (US)

(72) Inventors: Christopher John Merz, Wildwood, MO (US); Johan Gerber, Wildwood, MO (US); Douglas Van Horn, Kirkwood, MO (US); Mark B. Wiesman, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,025

(22) Filed: Aug. 22, 2022

(65) Prior Publication Data
US 2022/0405760 A1 Dec. 22, 2022

Related U.S. Application Data

(63) Continuation of application No. 14/711,567, filed on May 13, 2015, now Pat. No. 11,423,404.

(51) Int. Cl.
G06Q 20/12 (2012.01)
G06Q 20/40 (2012.01)

(52) U.S. Cl.
CPC ......... *G06Q 20/4016* (2013.01); *G06Q 20/12* (2013.01)

(58) Field of Classification Search
CPC ............... G06Q 20/4016; G06Q 20/12
(Continued)

(56) References Cited

U.S. PATENT DOCUMENTS 6,029,154 A * 2/2000 Pettitt ................. G06Q 20/403
705/79
7,403,922 B1 7/2008 Lewis et al.
(Continued)

FOREIGN PATENT DOCUMENTS

WO      199406103 A1    3/1994
WO      2002037219 A2   5/2002
WO      2014174506 A1   10/2014

OTHER PUBLICATIONS

International Search Report and Written Opinion dated Jul. 12, 2016—Application No. PCT/US2016/029578, 9 pages.

*Primary Examiner* — Bennett M Sigmond
*Assistant Examiner* — Michael J Warden
(74) *Attorney, Agent, or Firm* — Armstrong Teasdale LLP

(57) ABSTRACT

A computer-implemented method for determining a level of confidence that a payment transaction is not fraudulent is provided. The method is implemented using an assurance exchange (AE) computer device in communication with a memory. The method includes receiving authentication data associated with a candidate payment transaction being conducted by a cardholder via a website associated with a merchant from the merchant, storing the authentication data, receiving an authorization request message for the candidate payment transaction from a payment processor, retrieving the authentication data for the candidate payment transaction based on the authorization request message, and calculating an assurance level score based on the authentication data and the authorization request message. The assurance level score represents a level of confidence that the candidate payment transaction is not fraudulent. The method also includes transmitting the authorization request message including the assurance level score to an issuer processor.

20 Claims, 6 Drawing Sheets

(58) Field of Classification Search
USPC .......................................................... 705/44
See application file for complete search history.

(56) References Cited

U.S. PATENT DOCUMENTS

| | | | |
|---|---|---|---|
| 7,970,701 B2 | 6/2011 | Lewis et al. | |
| 8,244,629 B2 | 8/2012 | Lewis et al. | |
| 8,380,569 B2 | 2/2013 | Nightengale et al. | |
| 8,548,858 B2 | 10/2013 | May et al. | |
| 8,903,735 B2 | 12/2014 | Nightengale et al. | |
| 2002/0099649 A1* | 7/2002 | Lee .................... | G06Q 20/4016 705/38 |
| 2002/0194119 A1* | 12/2002 | Wright .................... | G06Q 20/10 705/38 |
| 2003/0130958 A1 | 7/2003 | Narayanan et al. | |
| 2004/0078273 A1 | 4/2004 | Loeb et al. | |
| 2004/0225473 A1 | 11/2004 | Aoki et al. | |
| 2006/0226216 A1* | 10/2006 | Keithley ................. | G06Q 40/03 235/379 |
| 2009/0265211 A1 | 10/2009 | May et al. | |
| 2010/0268696 A1 | 10/2010 | Nightengale et al. | |
| 2012/0180070 A1* | 7/2012 | Pafumi ................... | G06F 9/542 719/318 |
| 2012/0197802 A1 | 8/2012 | Smith et al. | |
| 2013/0110692 A1 | 5/2013 | Nightengale et al. | |
| 2013/0218758 A1* | 8/2013 | Koenigsbrueck ...... | G06Q 40/02 705/39 |
| 2014/0095385 A1 | 4/2014 | Ainslie et al. | |
| 2014/0172705 A1* | 6/2014 | Duke ................. | G06Q 20/4016 705/44 |
| 2014/0201077 A1* | 7/2014 | Cama ................... | G06Q 20/405 705/44 |
| 2015/0032625 A1 | 1/2015 | Dill et al. | |
| 2015/0032627 A1* | 1/2015 | Dill ..................... | G06Q 20/385 705/44 |
| 2015/0032628 A1 | 1/2015 | Randall | |
| 2015/0066768 A1 | 3/2015 | Williamson et al. | |
| 2015/0095227 A1* | 4/2015 | Brozek ............. | G06Q 20/4016 705/44 |
| 2015/0106265 A1* | 4/2015 | Stubblefield ....... | G06Q 20/4016 705/325 |
| 2016/0260100 A1 | 9/2016 | Wiesman | |
| 2016/0335639 A1* | 11/2016 | Merz ................. | G06Q 20/4016 |

* cited by examiner

SYSTEM AND METHODS FOR ENHANCED APPROVAL OF A PAYMENT TRANSACTION

CROSS REFERENCE TO RELATED APPLICATIONS

This application is a continuation Applications of and claims priority to U.S. patent application Ser. No. 14/711,567 filed May 13, 2015, entitled "SYSTEM AND METHODS FOR ENHANCED APPROVAL OF A PAYMENT TRANSACTION", the entire contents of which is hereby incorporated herein by reference in its entirety.

BACKGROUND OF THE DISCLOSURE

The field of the disclosure relates generally to enhancing fraud detection, and more specifically to methods and systems for determining a level of confidence that a payment transaction is not fraudulent.

At least some known credit/debit card purchases involve fraudulent activity. These fraudulent transactions present liability issues to one or more parties involved in the transaction, such as an issuing bank, a merchant, a payment processing network, or an acquirer bank. As such, these parties are interested in fraud detection, or the ability to analyze the data surrounding a payment card transaction before authorizing the transaction. For example, in online transactions through a merchant web site or "card-not-present" transactions, the merchant party in the transaction may assume initial liability for certain aspects of the transaction unless, for example, certain risk-mitigating steps are taken.

One such risk-mitigating step is cardholder authentication. For example, some payment networks engage an authentication service that performs an authentication of a suspect consumer prior to authorization of the transaction. The authentication service determines if the source of the transaction is the authorized user of the payment card. In addition to the authentication system, many known systems also use a fraud scoring system to detect potentially fraudulent transactions. While these systems may detect fraudulent transactions, the above systems also recommend approving fraudulent transactions (also known as false positives) or denying genuine transactions (also known as false negatives). These incorrect recommendations may cost the merchant and the issuing bank due to fraudulent charges or lost business. While the merchant is capable of collecting data about the cardholder associated with an online payment transaction, the constraints of many known payment processing systems limit the amount of data that may be provided to the issuing bank or the payment processing network. There exists a need for more advanced fraud detection systems.

BRIEF DESCRIPTION OF THE DISCLOSURE

A computer-implemented method for determining a level of confidence that a payment transaction is not fraudulent is provided. The method is implemented using an assurance exchange (AE) computer device in communication with a memory. The method includes receiving, from a merchant, authentication data associated with a candidate payment transaction being conducted by a cardholder via a website associated with the merchant, storing, in the memory, the authentication data, receiving, from a payment processor, an authorization request message for the candidate payment transaction, retrieving, from the memory, the authentication data for the candidate payment transaction based on the authorization request message, and calculating, by the AE computer device, an assurance level score based on the authentication data and the authorization request message. The assurance level score represents a level of confidence that the candidate payment transaction is not fraudulent. The method also includes transmitting, to an issuer processor, the authorization request message including the assurance level score.

An assurance exchange (AE) computer device used to determine a level of confidence that a payment transaction is not fraudulent is provided. The AE computer device includes a processor communicatively coupled to a memory device. The processor is programmed to receive, from a merchant, authentication data associated with a candidate payment transaction being conducted by a cardholder via a website associated with the merchant, store, in the memory device, the authentication data, receive, from a payment processor, an authorization request message for the candidate payment transaction, retrieve, from the memory device, the authentication data for the candidate payment transaction based on the authorization request message, and calculate an assurance level score based on the authentication data and the authorization request message. The assurance level score represents a level of confidence that the candidate payment transaction is not fraudulent. The processor is also programmed to transmit, to an issuer processor, the authorization request message including the assurance level score.

At least one non-transitory computer-readable storage media having computer-executable instructions embodied thereon is provided. When executed by an assurance exchange (AE) computer device having at least one processor coupled to at least one memory device, the computer-executable instructions cause the processor to receive, from a merchant, authentication data associated with a candidate payment transaction being conducted by a cardholder via a website associated with the merchant, store, in the memory device, the authentication data, receive, from a payment processor, an authorization request message for the candidate payment transaction, retrieve, from the memory device, the authentication data for the candidate payment transaction based on the authorization request message, and calculate an assurance level score based on the authentication data and the authorization request message. The assurance level score represents a level of confidence that the candidate payment transaction is not fraudulent. The computer-executable instructions also cause the processor to transmit, to an issuer processor, the authorization request message including the assurance level score.

BRIEF DESCRIPTION OF THE DRAWINGS

FIG. 1 is a schematic diagram illustrating an example multi-party transaction card industry system for enabling payment-by-card transactions in which merchants and card issuers do not need to have a one-to-one relationship.

FIG. 2 is a simplified block diagram of an example system used for determining a level of confidence that a payment transaction is not fraudulent.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart of a process for determining a level of confidence that a payment transaction is not fraudulent using the system shown in FIG. 2.

FIG. 6 is a diagram of components of one or more example computing devices that may be used in the system shown in FIG. 2.

DETAILED DESCRIPTION OF THE DISCLOSURE

Figure 1:
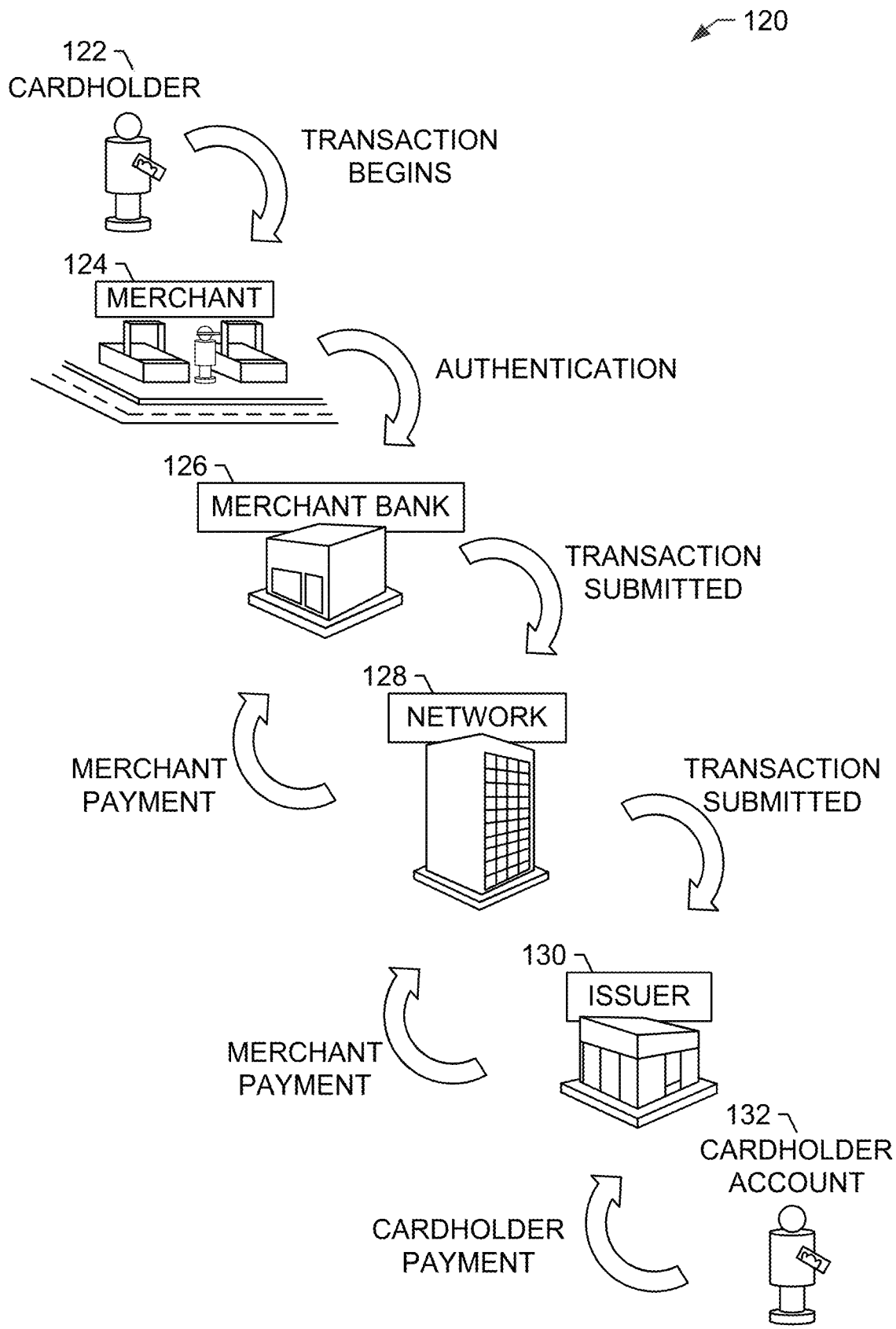
FIGS. 1-6 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. These system and methods determine a level of confidence that a payment transaction is not fraudulent based on data provided by the merchant.

One risk-mitigating step against fraudulent cardholder transactions is cardholder authentication. For example, some payment networks engage an authentication service that performs an authentication of a suspect consumer prior to authorization of the transaction. The authentication service determines if the source of the transaction is the authorized user of the payment card. During such authentication, the suspect consumer (i.e., the person attempting to perform the payment card transaction with the merchant) may be presented with an authentication challenge, sometimes called a "step-up challenge." This step-up challenge generally requires the suspect consumer to provide a password or a passcode from a second factor device before the transaction will be processed. By obtaining this additional factor from the suspect consumer, the likelihood of the suspect consumer being a fraudulent consumer is reduced. However, this extra step presents an interruptive inconvenience, a barrier, or an interference to at least some legitimate consumers and subsequently causes at least some consumers to abandon legitimate transactions. These abandonments results in lost revenues to many parties, such as the merchant, the merchant acquirer, and the issuer.

In addition to the authentication system, many known systems also use a fraud scoring system to detect potentially fraudulent transactions. The fraud scoring system receives the authorization request message, including the transaction information, on behalf of the fraud management platform. The fraud scoring system may use a variety of fraud scoring algorithms to generate a fraud score for the transaction, indicating the likelihood that the transaction is fraudulent. In addition, or alternatively, the payment card issuer may have predefined business rules, the violation of one or more of which results in a determination that a transaction is fraudulent or at a high risk of being fraudulent. If the fraud score generated by the fraud scoring system meets a threshold level (i.e., that the transaction is potentially fraudulent), and/or if one or more specific applicable business rules have been violated, the fraud scoring system creates a fraud scoring response message.

While these systems may detect fraudulent transactions, the above systems also recommend approving fraudulent transactions (also known as false positives) or denying genuine transactions (also known as false negatives). These incorrect recommendations may cost the merchant and the issuing bank due to fraudulent charges or lost business.

In the example embodiment, an assurance exchange (AE) computer device includes a processor in communication with a memory. The AE computer device is in communication with a payment processing network. In some embodiments, the AE computer device may be a part of the payment processing network, for example the network interchange, or the AE computer device may be separate from the payment processing network and merely in communication with the payment processing network. The payment processing network includes a point of sale, a merchant, a merchant bank, an interchange network, and an issuing bank (also known as an issuer processor). The AE computer device is configured to calculate an assurance level score for a candidate online payment transaction to assist the issuer processor, also known as the issuer bank, in determining whether to approve or deny the candidate online payment transaction.

In the example embodiment, the AE computer device receives authentication data from a merchant about a candidate online payment transaction. The candidate online payment transaction is for a payment card transaction through a website associated with the merchant. The authentication data includes a plurality of data elements about the candidate cardholder and the payment transaction (i.e., shipping address, billing address, and device identifiers). The AE computer device stores the received authentication data. When the AE computer device receives an authorization request message associated with the candidate online payment transaction, the AE computer device combines the stored authentication data with the transaction data provided in the authorization request message to calculate an assurance level score, which is an advanced fraud score, for the candidate online payment transaction. The AE computer device provides the assurance level score to the issuer processor for the transaction through the authorization request message.

In the example embodiment, the AE computer device receives authentication data for a candidate online payment transaction from a merchant. The candidate online payment transaction is a payment transaction that a cardholder conducts with the merchant via a website or an app (i.e., hosted on a mobile device) associated with the merchant. In the example embodiment, the candidate online payment transaction is a card-not-present transaction that occurs via a website or application, such as over the Internet. The authentication data is data used to determine if the source of the payment transaction is the authorized user of the payment card.

In some embodiments, authentication data includes one or more of: (1) consumer device attributes such as, for example, device attribute data (i.e., data derived from the device that the cardholder is transacting from, which can ultimately be used for creating a device fingerprint, and which may include IP address, physical address associated with IP address, device type, and phone number), and geo-location data (i.e., data from the device of the cardholder, indicating the assessed location of the device, such as GPS location, country, city, etc.); (2) data from the merchant such as, for example, consumer contact information (personally identifiable information (PII) about the cardholder associated with the payment account that the candidate online payment transaction is for, which will be used to determine the likelihood that the merchant has the correct cardholder, and which may include email address, mobile phone number, landline phone number, confirmed shipping address, and consumer identity verification (e.g., anonymous, unverified, externally scored (e.g., credit reference agency), authentic issued official ID (e.g., passport, driver's license)), and age of cardholder relationship); and (3) merchant reference data such as, for example, days account has been on file with the merchant, days since the cardholder last used the card on file, verification method of the cardholder performed by the merchant at the time of candidate online payment transaction, purchases information (i.e., type of goods/services provided-digital only, low value, high value with verified address, in-store), and a merchant risk score (i.e., a risk score derived from the merchant's risk systems and reference data, also known as a merchant fraud grading). In some embodiments, the merchant risk score may also include one or more merchant reason codes, which are codes that represent why the merchant assigned that particular merchant risk score to the candidate online payment transaction. For example a merchant reason code may indicate that the account associated with the cardholder has been on file with the merchant for over 180 days and has not changed in the last 90 days. Different merchants use different calculations or methods to determine a risk score for the candidate online payment transaction. Therefore, a 750 risk score from a first merchant may have a different meaning than a 750 risk score from a second merchant. Accordingly, the AE computer device includes the merchant reason codes in determining the meaning of the merchant risk code.

The AE computer device stores the authentication data associated with the candidate online payment transaction in a database. In some embodiments, the AE computer device calculates an initial assurance score based on the authentication data. The initial assurance score represents an authentication of the candidate online payment transaction that the merchant may use to decide whether to proceed with the candidate online payment transaction. The AE computer device transmits the initial assurance score to the merchant. The AE computer device stores the initial assurance score in the database.

The AE computer device receives an authorization request message for candidate online payment transaction from a payment network. In the example embodiment, the AE computer device receives the authorization request message from the interchange network. In other embodiments, the AE computer device receives the authorization request message from the merchant bank. The authorization request message includes transaction data about the candidate online payment transaction, such as, but not limited to, transaction amount, primary account number, and merchant identifier.

The AE computer device retrieves the authentication data associated with the candidate online payment transaction from the database. The AE computer device determines which set of stored authentication data is associated with the candidate online payment transaction to retrieve the corresponding authentication data. In some embodiments, the authentication data and the authorization request message each contain a transaction identifier. The AE computer device uses the transaction identifier to match up the stored authentication data with the corresponding authorization request message.

The AE computer device combines the authentication data and the authorization request message to calculate an assurance level score for the candidate online payment transaction. The assurance level score represents a level of confidence that the candidate online payment transaction is not fraudulent. In the example embodiment, the assurance level score includes a plurality of calculations and business rules to determine the level of confidence in the candidate online payment transaction. The AE computer device may also use the previously calculated initial assurance score in calculating the assurance level score.

In some embodiments, the AE computer device calculates a fraud score for the candidate online payment transaction based on the authentication data and the transaction data from the authorization request message. The AE computer device would then include the calculated fraud score in calculating the assurance level score. In other embodiments, the authentication data may include information on the procedures that that merchant used to authenticate the identity of the cardholder. The AE computer device may determine a level of trustworthiness for the merchant's authentication procedures based on historical data about the accuracy of those procedures.

Additionally, the AE computer device may consider a cost of a false positive and a cost of a false negative in calculating the assurance level score for the candidate online payment transaction. The cost of a false positive represents the likelihood that the cardholder will not use a particular payment card again when a genuine transaction is declined. The cost is the amount of revenue that would be lost if the cardholder does not use the particular payment card again. In determining the cost of a false positive, the AE computer device looks at the profitability of the cardholder in question. The AE computer device may evaluate the cardholder's total amount spent in a certain period of time, the amount that the interchange network earns off of the cardholder's payment transactions, cardholder's prior history of payment transactions similar to the candidate online payment transaction, and/or the size of the cardholder's transaction portfolio in comparison to other payment card accounts in the payment network or in the issuer processor. The cost of a false negative is the amount that will be lost if the candidate online payment transaction is fraudulent. In some embodiments, this amount is based on the transaction amount. In other embodiments, the AE computer device may determine that candidate online payment transaction may be a probing transaction or the beginning of a series of fraudulent transactions. The AE computer device may calculate the cost of a false negative based on the cost of historical series of similar fraudulent transactions.

The AE computer device calculates the assurance level score to assist the issuer processor in determining whether to approve or deny the candidate online payment transaction. In the example embodiment, the assurance level score is a numerical value that is broken down into different ranges, where each range has a different meaning. An example assurance level score chart is shown in the table below:

TABLE 1

Assurance Level Score

| Value | Meaning |
|---|---|
| 0-299 | Very High Likelihood of Fraud |
| 300-449 | High Likelihood of Fraud |
| 450-599 | Likely Fraud |
| 600-749 | Not Enough Information to Trust |
| 750-899 | Trusted |
| 900-999 | Highly Trusted |

In addition to the assurance level score, the AE computer device may also generate one or more reason codes for the assurance level score. The reason codes represent reasons why the AE computer device calculated the assurance level score at that value. For example one of the reason codes may be that the merchant has a very good track record at detecting fraud. The assurance level score and the reason codes are added to the authorization request message. In some embodiments, one or more of the merchant reason codes are added to the authorization request message, either instead of or in addition to the reason codes generated by the AE computer device.

The AE computer device transmits the authorization request message including the assurance level score to the issuer processor. In the example embodiment, the AE computer device transmits the authorization request message to the payment processing network, which then transmits the authorization request message to the issuer processor. In other embodiments, the AE computer device is in direct communication with issuer processor.

In some embodiments, the AE computer device receives a request for the assurance level score from a client system. In some embodiments, the request comes from the merchant. In other embodiments, the request comes from other sources, such as the merchant bank. The request includes a transaction identifier. The AE computer device determines which candidate online payment transaction is associated with the received transaction identifier. The AE computer device retrieves the assurance level score from the database and transmits the assurance level score to the requesting client system. In some embodiments, the AE computer device also transmits the reason codes transmitted in the authorization request message. In some further embodiments, the AE computer device may receive a request from a client system associated with the issuer processor for additional information from authentication data about candidate online payment transaction. The AE computer device then transmits the requested data.

The methods and system described herein may be implemented using computer programming or engineering techniques including computer software, firmware, hardware, or any combination or subset. As disclosed above, at least one technical problem with prior systems is that there is a need for enhanced fraud detection and the ability to provide more information to the issuer processor to determine whether to approve or deny an online payment transaction. The system and methods described herein address that technical problem. The technical effect of the systems and processes described herein is achieved by performing at least one of the following steps: (a) receiving from a merchant authentication data associated with a candidate payment transaction being conducted by a cardholder via a website associated with the merchant, wherein the authentication data includes a merchant fraud grading of the cardholder and the candidate payment transaction performed by the merchant, wherein the authentication data includes one or more merchant reason codes that each represent a reason for the merchant fraud grading; (b) generating an initial assurance score based on the authentication data; (c) transmitting to the merchant the initial assurance score; (d) storing the authentication data and the initial assurance score; (e) receiving from a payment processor an authorization request message for the candidate payment transaction; (f) retrieving the authentication data for the candidate payment transaction based on the authorization request message; (g) calculating an assurance level score based on the authentication data, the authorization request message, the initial assurance score, a cost of a false positive, a cost of a false negative, and a probability that the candidate payment transaction is fraudulent, wherein the assurance level score represents a level of confidence that the candidate payment transaction is not fraudulent; (h) generating one or more reason codes based on the authentication data, the authorization request message, and the assurance level score, wherein each of the one or more reason codes represents a reason for the assurance level score; and (i) transmitting to an issuer processor the authorization request message including the assurance level score, at least one of the one or more merchant reason codes, and at least one of the one or more generated reason codes. The resulting technical effect is that a more accurate fraud detection system provides an enhanced fraud score to the issuer processor to assist the issuer processor in determining whether to approve or deny an online payment transaction.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling payment-by-card transactions in which merchants 124 and card issuers 130 do not need to have a one-to-one relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, New York).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
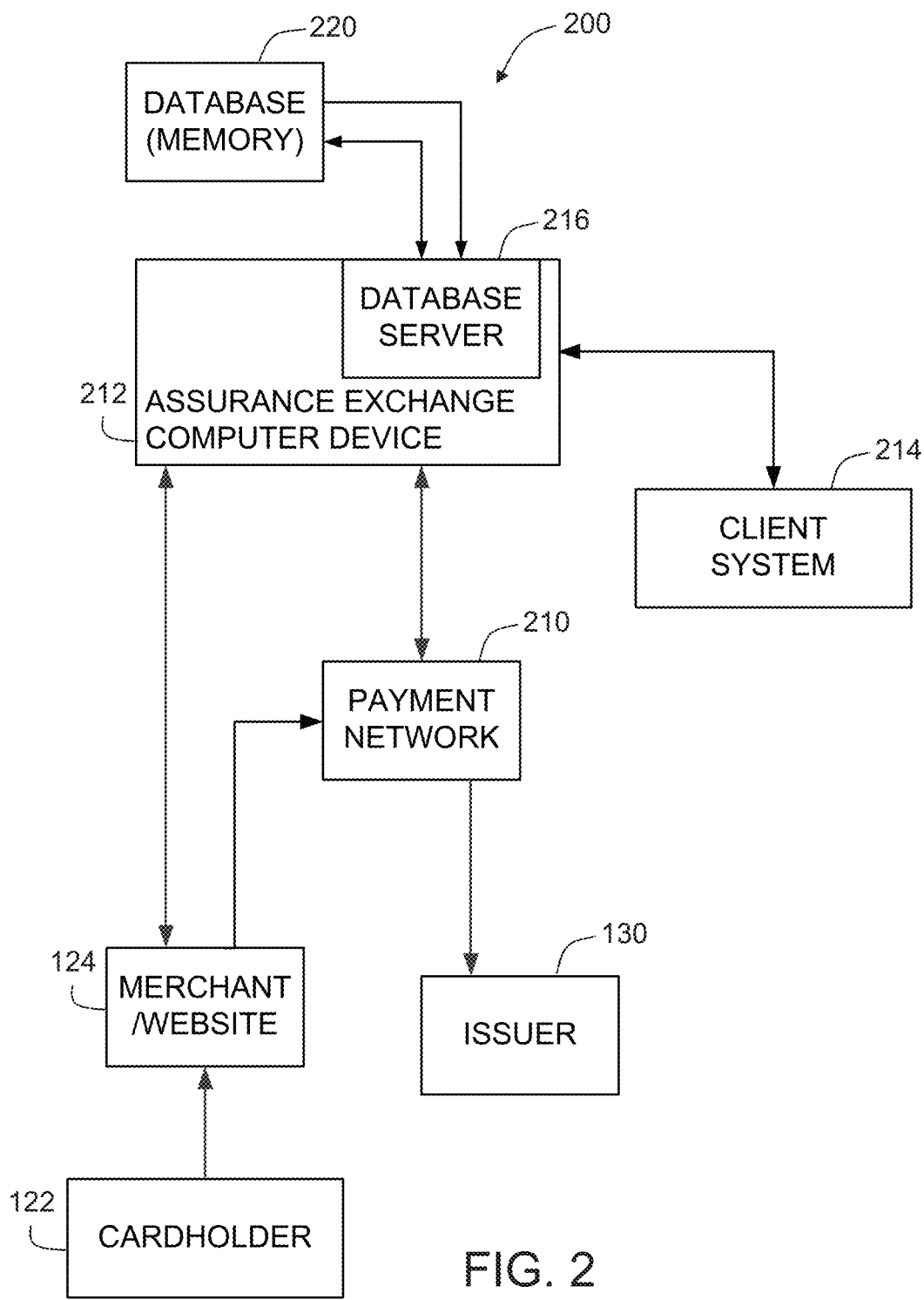

FIG. 2 is a simplified block diagram of an example system 200 used for determining a level of confidence that a payment transaction is not fraudulent. In the example embodiment, system 200 may be used for performing payment-by-card transactions received as part of processing cardholder transactions. In addition, system 200 is a payment processing system that includes an assurance exchange ("AE") computer device 212 configured to determine a level of confidence that a payment transaction is not fraudulent. As described below in more detail, AE computer device 212 is configured to receive authentication data associated with a candidate payment transaction being conducted by a cardholder 122 via a website associated with merchant 124 (both shown in FIG. 1), store the authentication data, receive an authorization request message for the candidate payment transaction from an interchange network 128 (also known as a payment processor), retrieve the stored authentication data for the candidate payment transaction based on the authorization request message, calculate an assurance level score based on the authentication data and the authorization request message, and transmit the authorization request message including the assurance level score to an issuer processor 130 (shown in FIG. 1).

In the example embodiment, client systems 214 are computers that include a web browser or a software application to enable client systems 214 to access AE computer device 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, cardholder 122 uses a client system 214 to access a commerce website for merchant 124.

A database server 216 is communicatively coupled to a database 220 that stores data. In one embodiment, database 220 includes authentication data, authorization request messages, assurance level scores, and reason codes. In the example embodiment, database 220 is stored remotely from AE computer device 212. In some embodiments, database 220 is decentralized. In the example embodiment, a person can access database 220 via client systems 214 by logging onto AE computer device 212, as described herein.

AE computer device 212 is communicatively coupled with payment network 210. Payment network 210 represents one or more parts of payment network 120 (shown in FIG. 1). In the example embodiment, AE computer device 212 is in communication with one or more computer devices associated with interchange network 128. In other embodiments, AE computer device 212 is in communication with one or more computer devices associated with merchant bank 126 (shown in FIG. 1). In some embodiments, AE computer device 212 may be associated with, or is part of payment network 120, or in communication with payment network 120, shown in FIG. 1. In other embodiments, AE computer device 212 is associated with a third party and is in communication with payment network 120. In some embodiments, AE computer device 212 may be associated with, or be part of merchant bank 126, interchange network 128, and issuer bank 130. In addition, AE computer device 212 is communicatively coupled with merchant 124. In the example embodiment, AE computer device 212 is in communication with merchant 124 and client systems 214 via Application Programming Interface (API) calls. Through the API call, merchant 124 may transmit information to and receive information from AE computer device 212.

In some embodiments, AE computer device 212 may be associated with the financial transaction interchange network 128 shown in FIG. 1 and may be referred to as an interchange computer system. AE computer device 212 may be used for processing transaction data and analyzing for fraudulent transactions. In addition, at least one of client systems 214 may include a computer system associated with an issuer 130 of a transaction card. Accordingly, AE computer device 212 and client systems 214 may be utilized to process transaction data relating to purchases a cardholder 122 makes utilizing a transaction card processed by interchange network 128 and issued by the associated issuer 130. At least one client system 214 may be associated with a user or a cardholder 122 seeking to register, access information, or process a transaction with at least one of interchange network 128, issuer 130, or merchant 124. In addition, client systems 214 may include point-of-sale (POS) devices associated with merchant 124 and used for processing payment transactions.

Figure 3:
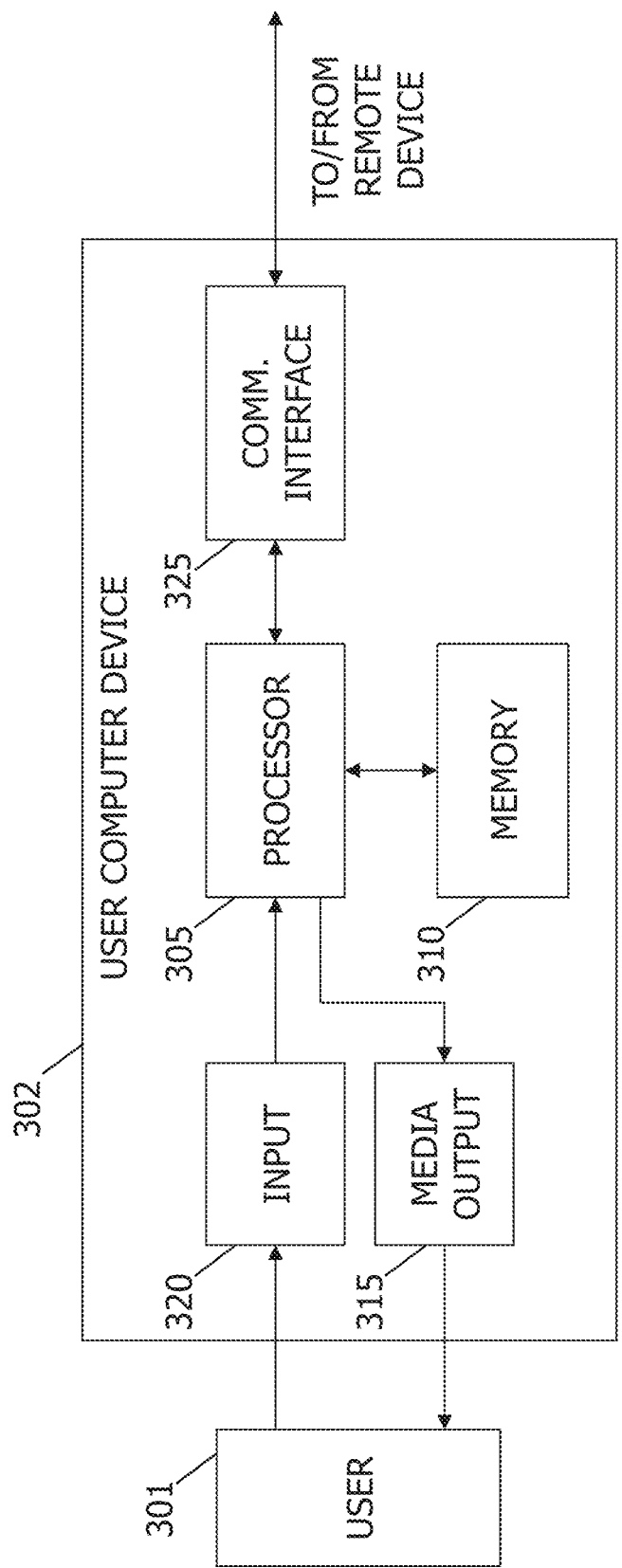

FIG. 3 illustrates an example configuration of a client system 214 shown in FIG. 2, in accordance with one embodiment of the present disclosure. User computer device 302 is operated by a user 301. User computer device 302 may include, but is not limited to, client systems 214, computer devices associated with merchant 124, and computer devices associated with cardholder 122 (both shown in FIG. 1). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as AE computer device 212 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from AE computer device 212. A client application allows user 301 to interact with, for example, AE computer device 212. For example, instructions may be stored by a cloud service and the output of the execution of the instructions sent to the media output component 315.

Figure 4:
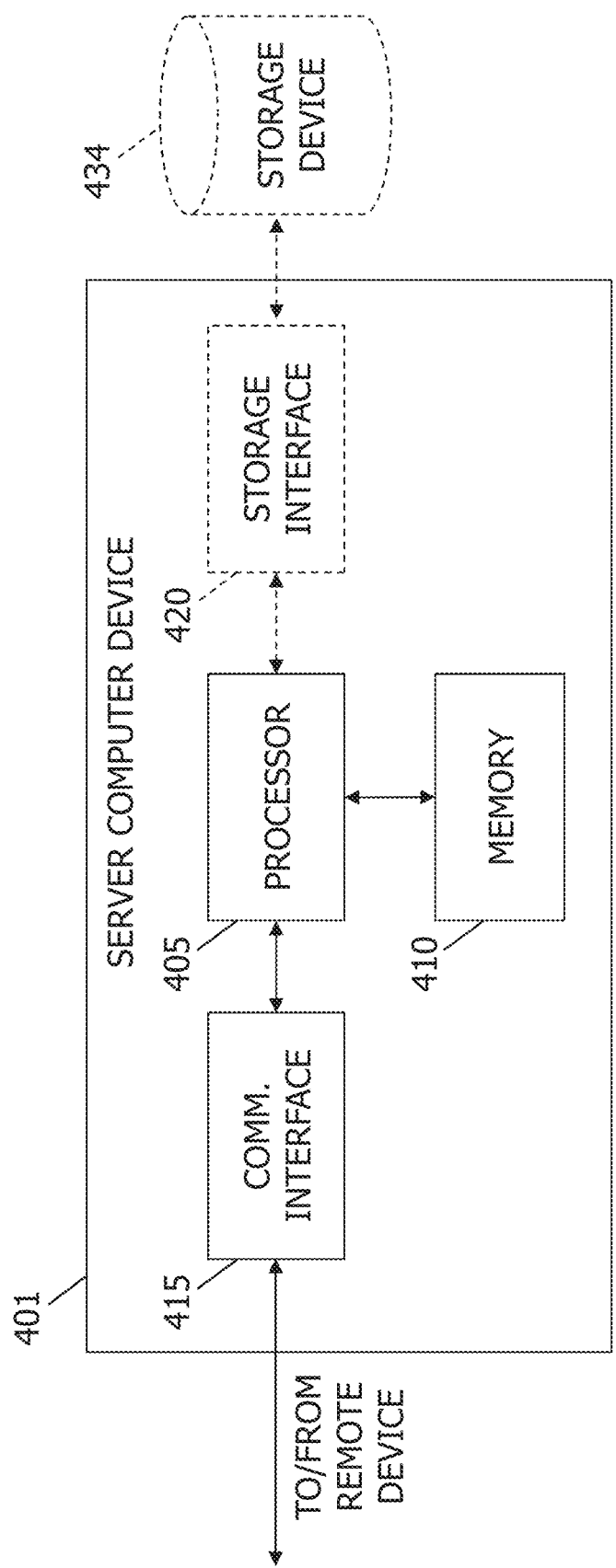

FIG. 4 illustrates an example configuration of a server system shown in FIG. 2, in accordance with one embodiment of the present disclosure. Server computer device 401 may include, but is not limited to, database server 216 and AE computer device 212 (both shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or AE computer device 212 (both shown in FIG. 2). For example, communication interface 415 may receive requests from client systems 214 via the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
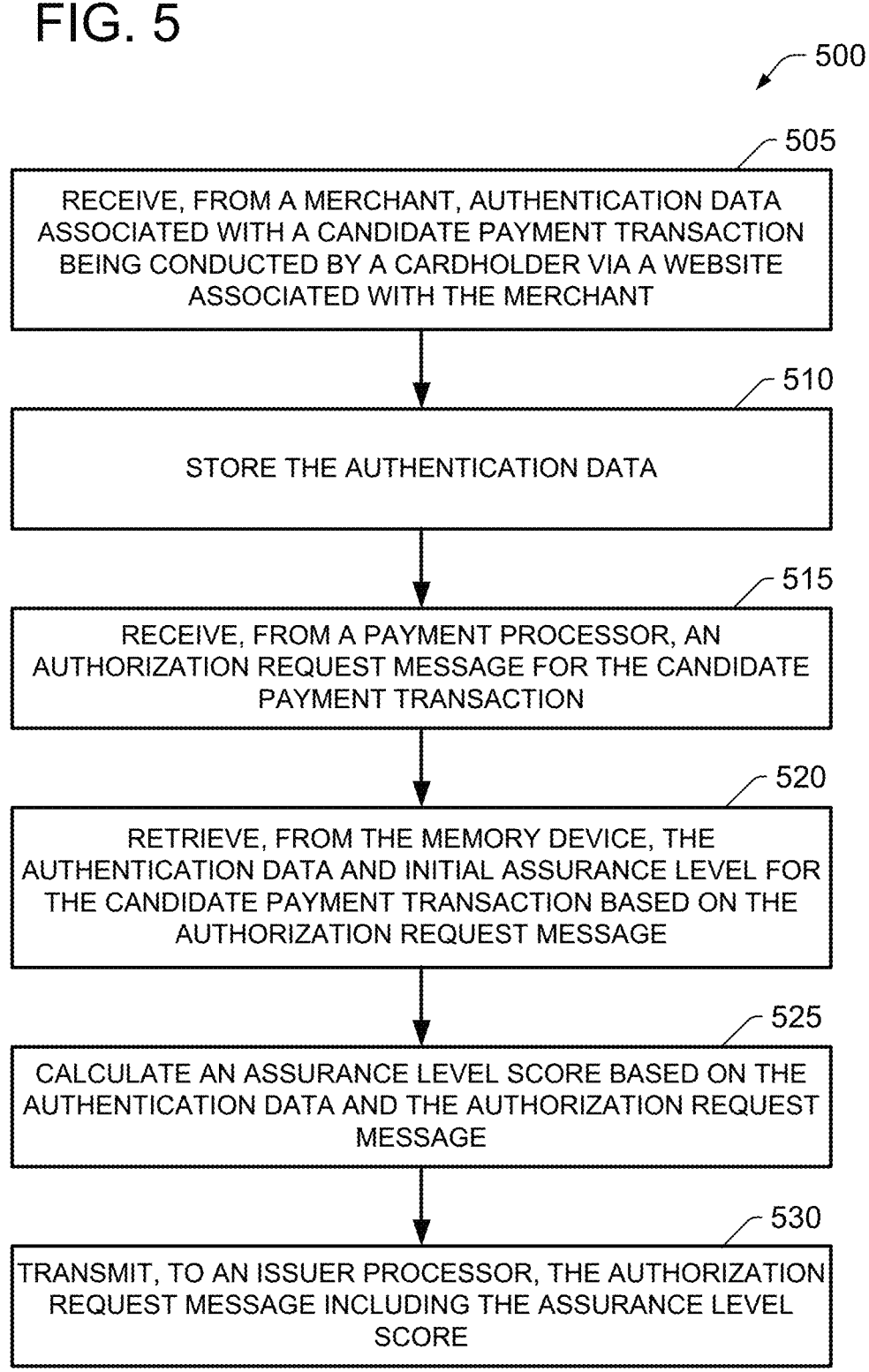

FIG. 5 is a flow chart of a process 500 for determining a level of confidence that a payment transaction is not fraudulent using system 200 shown in FIG. 2. In the example embodiment, process 500 is performed by AE computer device 212 (shown in FIG. 2).

In the example embodiment, AE computer device 212 receives 505 authentication data for a candidate online payment transaction from merchant 124 (shown in FIG. 1). The candidate online payment transaction is a payment transaction that cardholder 122 (shown in FIG. 1) conducts with merchant 124 via a website associated with merchant 124. The authentication data is data used to determine if the source of the payment transaction is the authorized user of the payment card.

In some embodiments, authentication data includes one or more of: (1) consumer device attributes such as, for example, device attribute data (i.e., data derived from the device that cardholder 122 is transacting from, which can ultimately be used for creating a device fingerprint, and which may include IP address, physical address associated with IP address, device type, and phone number), and geo-location data (i.e., data from the device of cardholder 122, indicating the assessed location of the device, such as GPS location, country, city, etc.); (2) data from merchant 124 such as, for example, consumer contact information (personally identifiable information (PII) about cardholder 122 associated with payment account 132 (shown in FIG. 1) that the candidate online payment transaction is for, which will be used to determine the likelihood that merchant 124 has the correct cardholder 122, and which may include email address, mobile phone number, landline phone number, confirmed shipping address, and consumer identity verification (e.g., anonymous, unverified, externally scored (e.g., credit reference agency), authentic issued official ID (e.g., passport, driver's license)), and age of cardholder relationship); and (3) merchant reference data such as, for example, days account has been on file with merchant 124, days since cardholder 122 last used the card on file, verification method of cardholder 122 performed by merchant 124 at the time of candidate online payment transaction, purchases information (i.e., type of goods/services provided-digital only, low value, high value with verified address, in-store), and a merchant risk score (i.e., a risk score derived from the merchant's risk systems and reference data, also known as a merchant fraud grading). In some embodiments, the merchant risk score may also include one or more merchant reason codes, which are codes that represent why merchant 124 assigned that particular merchant risk score to the candidate online payment transaction. For example a merchant reason code may indicate that the account associated with cardholder 122 has been on file with merchant 124 for over 180 days and has not changed in the last 90 days. Different merchants use different calculations or methods to determine a risk score for the candidate online payment transaction. Therefore, a 750 risk score from a first merchant may have a different meaning than a 750 risk score from a second merchant. Accordingly, AE computer device 212 includes the merchant reason codes in determining the meaning of the merchant risk code.

AE computer device 212 stores 510 the authentication data associated with the candidate online payment transaction in database 220 (shown in FIG. 2). In some embodiments, AE computer device 212 calculates an initial assurance score based on the authentication data. The initial assurance score represents an authentication of the candidate online payment transaction that merchant 124 may use to decide whether to proceed with the candidate online payment transaction. AE computer device 212 transmits the initial assurance score to merchant 124. AE computer device 212 stores 510 the initial assurance score in database 220.

AE computer device 212 receives 515 an authorization request message for candidate online payment transaction from payment network 210 (shown in FIG. 2). In the example embodiment, AE computer device 212 receives 515 the authorization request message from interchange network 128 (shown in FIG. 1). In other embodiments, AE computer device 212 receives 515 the authorization request message from merchant bank 126 (shown in FIG. 1). The authorization request message includes transaction data about the candidate online payment transaction, such as, but not limited to, transaction amount, primary account number, and merchant identifier.

AE computer device 212 retrieves 520 the authentication data associated with the candidate online payment transaction from database 220. AE computer device 212 determines which set of stored authentication data is associated with the candidate online payment transaction to retrieve 520 the corresponding authentication data. In some embodiments, the authentication data and the authorization request message each contain a transaction identifier. AE computer device 212 uses the transaction identifier to match up the stored authentication data with the corresponding authorization request message.

AE computer device 212 combines the authentication data and the authorization request message to calculate 525 an assurance level score for the candidate online payment transaction. The assurance level score represents a level of confidence that the candidate online payment transaction is not fraudulent. In the example embodiment, the assurance level score includes a plurality of calculations and business rules to determine the level of confidence in the candidate online payment transaction. AE computer device 212 may also use the previously calculated initial assurance score in calculating 525 the assurance level score.

In some embodiments, AE computer device 212 calculates a fraud score for the candidate online payment transaction based on the authentication data and the transaction data from the authorization request message. AE computer device 212 would then include the calculated fraud score in calculating 525 the assurance level score. In other embodiments, the authentication data may include information on the procedures that merchant 124 used to authenticate the identity of cardholder 122. AE computer device 212 may determine a level of trustworthiness for the merchant's authentication procedures based on historical data about the accuracy of those procedures.

Additionally, AE computer device 212 may consider a cost of a false positive and a cost of a false negative in calculating 525 the assurance level score for the candidate online payment transaction. The cost of a false positive represents the likelihood that cardholder 122 will not use a particular payment card again when a genuine transaction is declined. The cost is the amount of revenue that would be lost if cardholder 122 does not use the particular payment card again. In determining the cost of a false positive, AE computer device 212 looks at the profitability of the cardholder in question. AE computer device 212 may evaluate the cardholder's total amount spent in a certain period of time, the amount that interchange network 128 earns off of the cardholder's payment transactions, cardholder's prior history of payment transactions similar to the candidate online payment transaction, and/or the size of the cardholder's transaction portfolio in comparison to other payment card accounts in interchange network 128 or in issuer processor 130. The cost of a false negative is the amount that will be lost if the candidate online payment transaction is fraudulent. In some embodiments, this amount is based on the transaction amount. In other embodiments, AE computer device 212 may determine that candidate online payment transaction may be a probing transaction or the beginning of a series of fraudulent transactions. AE computer device 212 may calculate the cost of a false negative based on the cost of historical series of similar fraudulent transactions.

AE computer device 212 calculates 525 the assurance level score to assist issuer processor 130 in determining whether to approve or deny the candidate online payment transaction. In the example embodiment, the assurance level score is a numerical value that is broken down into different ranges, where each range has a different meaning. An example assurance level score chart is shown in the table below:

TABLE 2

Assurance Level Score

| Value | Meaning |
| --- | --- |
| 0-299 | Very High Likelihood of Fraud |
| 300-449 | High Likelihood of Fraud |
| 450-599 | Likely Fraud |
| 600-749 | Not Enough Information to Trust |
| 750-899 | Trusted |
| 900-999 | Highly Trusted |

In addition to the assurance level score, AE computer device 212 may also generate one or more reason codes for the assurance level score. The reason codes represent reasons why AE computer device 212 calculated the assurance level score at that value. For example one of the reason codes may be that merchant 124 has a very good track record at detecting fraud. The assurance level score and the reason codes are added to the authorization request message. In some embodiments, one or more of the merchant reason codes are added to the authorization request message, either instead of or in addition to the reason codes generated by AE computer device 212.

AE computer device 212 transmits 530 the authorization request message including the assurance level score to issuer processor 130. In the example embodiment, AE computer device 212 transmits 530 the authorization request message to payment network 210, which then transmits the authorization request message to issuer processor 130. In other embodiments, AE computer device 212 is in direct communication with issuer processor 130.

In some embodiments, AE computer device 212 receives a request for the assurance level score from client system 214. In some embodiments, the request comes from merchant 124. In other embodiments, the request comes from other sources, such as merchant bank 126. The request includes a transaction identifier. AE computer device 212 determines which candidate online payment transaction is associated with the received transaction identifier. AE computer device 212 retrieves the assurance level score from database 220 and transmits the assurance level score to the requesting client system 214. In some embodiments, AE computer device 212 also transmits the reason codes transmitted in the authorization request message. In some further embodiments, AE computer device 212 may receive a request from client system 214 associated with issuer processor 130 for additional information from authentication data about candidate online payment transaction. AE computer device 212 then transmits the requested data.

Figure 6:
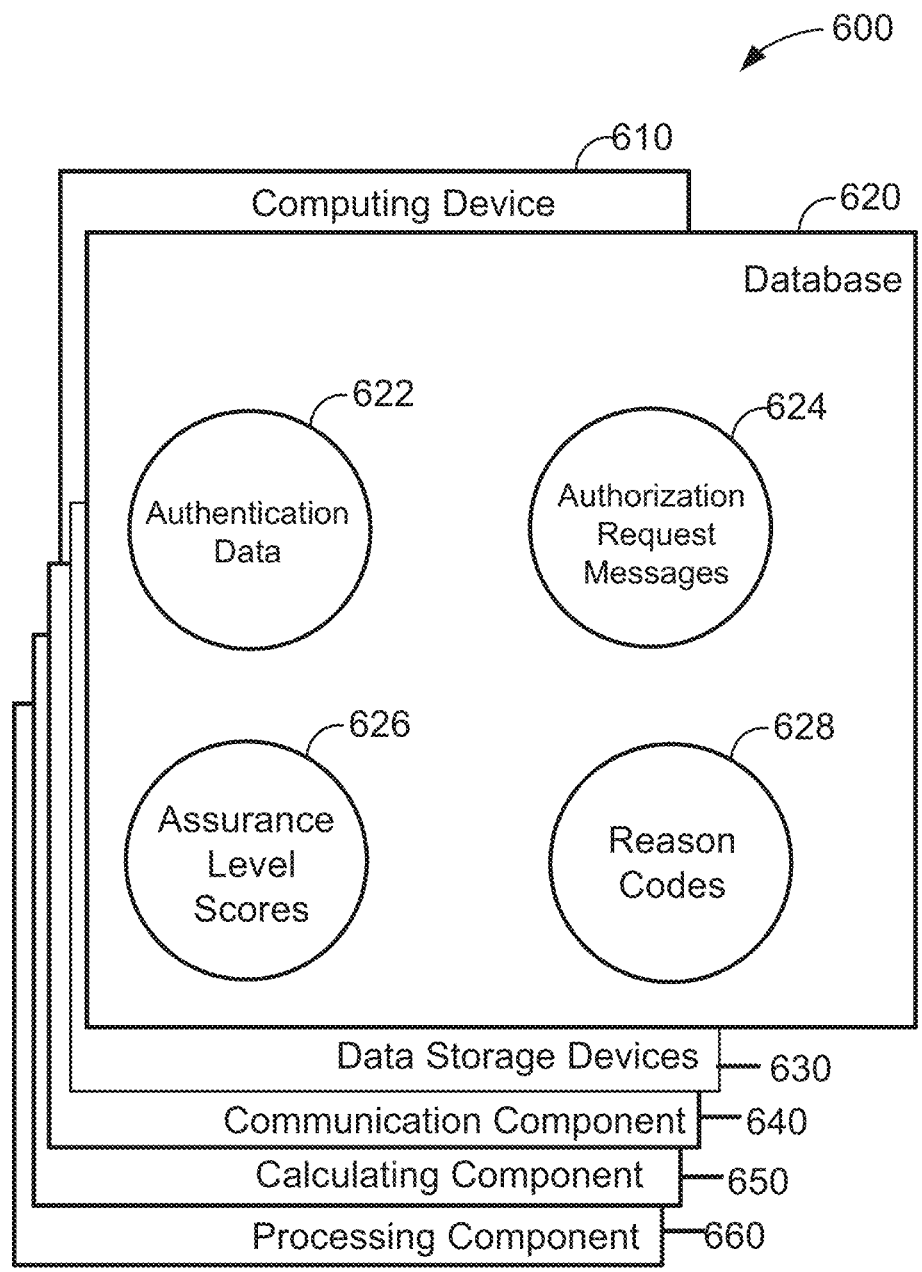

FIG. 6 is a diagram 600 of components of one or more example computing devices that may be used in system 200 shown in FIG. 2. In some embodiments, computing device 610 is similar to AE computer device 212 (shown in FIG. 2). Database 620 may be coupled with several separate components within computing device 610, which perform specific tasks. In this embodiment, database 620 includes authentication data 622, authorization request messages 624, assurance level scores 626, and reason codes 628. In some embodiments, database 620 is similar to database 220 (shown in FIG. 2).

Computing device 610 includes database 620, as well as data storage devices 630. Computing device 610 also includes a communication component 640 for receiving 505 authentication data, receiving 515 an authorization request message, and transmitting 530 the authorization request message (all shown in FIG. 5). Computing device 610 also includes a calculating component 650 for calculating 525 an assurance level score (shown in FIG. 5). A processing component 660 assists with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A computer-implemented method for adding data in an online payment transaction within an authorization request message to an authorizer computer device, the authorizer computer device configured to require the authorization request message to be formatted according to a predefined communications standard, the predefined communications standard limiting an amount of data that can be included in the authorization request message, the method implemented using an assurance exchange (AE) computer device including a processor in communication with a memory device, the AE computer device in communication with a payment processing interchange network and a merchant processor computer device associated with a merchant, the method comprising:

receiving an electronic message from the merchant processor computer device over an authentication communication network communicatively coupling the AE computer device to the merchant processor computer device, the electronic message including authentication data associated with a candidate online payment transaction being conducted by a candidate accountholder using a user computer device to access a website associated with the merchant, wherein the authentication data includes a first plurality of data elements including user computer device attributes associated with the user computer device, candidate accountholder data associated with the candidate accountholder, merchant reference data associated with the merchant, and a first transaction identifier, and wherein the authentication data is used to determine whether the candidate accountholder is authorized to conduct the candidate online payment transaction;

storing, in the memory device, the authentication data from the electronic message;

subsequent to receiving the authentication data, electronically receiving, from a computer device over the payment processing interchange network, the authorization request message for the candidate online payment transaction, the authorization request message formatted according to the predefined communications standard, wherein the authorization request message is initiated at the merchant processor computer device, wherein the authorization request message is different from the electronic message, wherein the authorization request message is used to determine whether to decline or approve the candidate online payment transaction, wherein the authorization request message includes transaction data including a second plurality of data elements associated with the candidate online payment transaction and including a transaction amount associated with the candidate online payment transaction, an account number associated with the candidate online payment transaction, a merchant identifier associated with the candidate online payment transaction, and a second transaction identifier, and wherein at least a set of the second plurality of data elements is different from at least a set of the first plurality of data elements;

combining, by the AE computer device, the first and second plurality of data elements in the authentication data and the transaction data by matching the second transaction identifier with the first transaction identifier;

calculating, by the AE computer device, a value of an assurance level score for the candidate online payment transaction using the combination of the authentication data and the transaction data, wherein the assurance level score is an advanced fraud score representing a level of confidence that the candidate online payment transaction is not fraudulent, and wherein the assurance level score is configured to assist an authorizer associated with the authorizer computer device to determine whether to approve or deny the candidate online payment transaction based on the level of confidence;

generating, by the AE computer device, one or more reason codes based on the authentication data, the transaction data, and the assurance level score, wherein each of the one or more reason codes represents a reason for the value of the assurance level score;

adding, by the AE computer device, the assurance level score and the one or more reason codes into the authorization request message, wherein subsequent to the adding, the authorization request message remains formatted according to the predefined communications standard for receipt by the authorizer computer device; and transmitting, to the authorizer computer device over the payment processing interchange network, the authorization request message including the assurance level score and the one or more reason codes.

2. The method in accordance with claim 1, further comprising:
generating an initial assurance score based on the authentication data; and
transmitting, to the merchant, the initial assurance score.

3. The method in accordance with claim 1, wherein the authentication data includes a merchant fraud grading of the candidate accountholder and the candidate online payment transaction.

4. The method in accordance with claim 3, wherein the authentication data includes one or more merchant reason codes that each represent a reason for the merchant fraud grading, and wherein when the authorization request message is transmitted to the authorizer computer device, the authorization request message further includes at least one of the one or more merchant reason codes.

5. The method in accordance with claim 1 further comprising:
determining, by the AE computer device, a cost of a false negative based on a cost of a historical series of previous transactions determined fraudulent and having data elements similar to data elements associated with the candidate online payment transaction, wherein the cost of the false negative represents an amount that will be lost if the candidate online payment transaction is scored as being fraudulent.

6. The method in accordance with claim 1 further comprising:
determining, by the AE computer device, a cost of a false positive based on a profitability of the candidate accountholder, wherein the cost of the false positive represents a likelihood that the candidate accountholder stops using a particular payment account when a genuine payment transaction associated with the particular payment account is declined.

7. The method in accordance with claim 1, further comprising calculating, by the AE computer device, the value of the assurance level score for the candidate online payment transaction using a cost of a false negative and a cost of a false positive.

8. An assurance exchange (AE) computer device used to add data in an online payment transaction within an authorization request message to an authorizer computer device, the authorizer computer device configured to require the authorization request message to be formatted according to a predefined communications standard, the predefined communications standard limiting an amount of data that can be included in the authorization request message, said AE computer device comprising a processor communicatively coupled to a memory device, said AE computer device in communication with a payment processing interchange network and a merchant processor computer device associated with a merchant, said processor programmed to:

receive an electronic message from the merchant processor computer device over an authentication communication network communicatively coupling the AE computer device to the merchant processor computer device, the electronic message including authentication data associated with a candidate online payment transaction being conducted by a candidate accountholder using a user computer device to access a website associated with the merchant, wherein the authentication data includes a first plurality of data elements including user computer device attributes associated with the user computer device, candidate accountholder data associated with the candidate accountholder, merchant reference data associated with the merchant, and a first transaction identifier, and wherein the authentication data is used to determine whether the candidate accountholder is authorized to conduct the candidate online payment transaction;

store, in the memory device, the authentication data from the electronic message;

subsequent to receiving the authentication data, electronically receive, from a computer device associated with the payment processing interchange network, the authorization request message for the candidate online payment transaction, the authorization request message formatted according to the predefined communications standard, wherein the authorization request message is initiated at the merchant processor computer device, wherein the authorization request message is different from the electronic message, wherein the authorization request message is used to determine whether to decline or approve the candidate online payment transaction, wherein the authorization request message includes transaction data including a second plurality of data elements associated with the candidate online payment transaction and including a transaction amount associated with the candidate online payment transaction, an account number associated with the candidate online payment transaction, a merchant identifier associated with the candidate online payment transaction, and a second transaction identifier, and wherein at least a set of the second plurality of data elements is different from at least a set of the first plurality of data elements;
combine the first and second plurality of data elements in the authentication data and the transaction data by matching the second transaction identifier with the first transaction identifier;
calculate a value of an assurance level score for the candidate online payment transaction using the combination of the authentication data and the transaction data, wherein the assurance level score is an advanced fraud score representing a level of confidence that the candidate online payment transaction is not fraudulent, and wherein the assurance level score is configured to assist an authorizer associated with the authorizer computer device to determine whether to approve or deny the candidate online payment transaction based on the level of confidence;
generate one or more reason codes based on the authentication data, the transaction data, and the assurance level score, wherein each of the one or more reason codes represents a reason for the value of the assurance level score;
add the assurance level score and the one or more reason codes into the authorization request message, wherein subsequent to the adding, the authorization request message remains formatted according to the predefined communications standard for receipt by the authorizer computer device; and
transmit, to the authorizer computer device over the payment processing interchange network, the authorization request message including the assurance level score and the one or more reason codes.

9. The AE computer device in accordance with claim 8, wherein said processor is further programmed to:
generate an initial assurance score based on the authentication data; and
transmit, to the merchant processor computer device, the initial assurance score.

10. The AE computer device in accordance with claim 8, wherein the authentication data includes a merchant fraud grading of the candidate accountholder and the candidate online payment transaction.

11. The AE computer device in accordance with claim 10, wherein the authentication data includes one or more merchant reason codes that each represent a reason for the merchant fraud grading, and wherein when the authorization request message is transmitted to the authorizer computer device, the authorization request message further includes at least one of the one or more merchant reason codes.

12. The AE computer device in accordance with claim 8, wherein said processor is further programmed to transmit, to the merchant processor computer device, the assurance level score and the one or more reason codes.

13. The AE computer device in accordance with claim 8, wherein said processor is further programmed to:
determine a cost of a false negative based on a cost of a historical series of previous transactions determined fraudulent and having data elements similar to data elements associated with the candidate online payment transaction, wherein the cost of the false negative represents an amount that will be lost if the candidate online payment transaction is scored as being fraudulent.

14. The AE computer device in accordance with claim 8, wherein said processor is further programmed to:
determine a cost of a false positive based on a profitability of the candidate accountholder, wherein the cost of the false positive represents a likelihood that the candidate accountholder stops using a particular payment account when a genuine payment transaction associated with the particular payment account is declined.

15. The AE computer device in accordance with claim 8, wherein the assurance level score is further based on a probability that the candidate online payment transaction is fraudulent.

16. At least one non-transitory computer-readable storage medium having computer-executable instructions embodied thereon for adding data in an online payment transaction within an authorization request message to an authorizer computer device, the authorizer computer device configured to require the authorization request message to be formatted according to a predefined communications standard, the predefined communications standard limiting an amount of data that can be included in the authorization request message, wherein when executed by an assurance exchange (AE) computer device having at least one processor coupled to at least one memory device, the AE computer device in communication with a payment processing interchange network and a merchant processor computer device associated with a merchant, the computer-executable instructions cause the at least one processor to:
receive an electronic message from the merchant processor computer device over an authentication communication network communicatively coupling the AE computer device to the merchant processor computer device, the electronic message including authentication data associated with a candidate online payment transaction being conducted by a candidate accountholder using a user computer device to access a website associated with the merchant, wherein the authentication data includes a first plurality of data elements including user computer device attributes associated with the user computer device, candidate accountholder data associated with the candidate accountholder, merchant reference data associated with the merchant, and a first transaction identifier, and wherein the authentication data is used to determine whether the candidate accountholder is authorized to conduct the candidate online payment transaction;
store the authentication data from the electronic message;
subsequent to receiving the authentication data, electronically receive, from a computer device associated with the payment processing interchange network, the authorization request message for the candidate online payment transaction, the authorization request message formatted according to the predefined communications standard, wherein the authorization request message is initiated at the merchant processor computer device, wherein the authorization request message is different from the electronic message, wherein the authorization request message is used to determine whether to decline or approve the candidate online payment transaction, wherein the authorization request message includes transaction data including a second plurality of data elements associated with the candidate online payment transaction and including a transaction amount associated with the candidate online payment transaction, an account number associated with the candidate online payment transaction, a merchant identifier associated with the candidate online payment transaction, and a second transaction identifier, and wherein at least a set of the second plurality of data elements is different from at least a set of the first plurality of data elements;

combine the first and second plurality of data elements in the authentication data and the transaction data by matching the second transaction identifier with the first transaction identifier;

calculate a value of an assurance level score for the candidate online payment transaction using the combination of the authentication data and the transaction data, wherein the assurance level score is an advanced fraud score representing a level of confidence that the candidate online payment transaction is not fraudulent, and wherein the assurance level score is configured to assist an authorizer associated with the authorizer computer device to determine whether to approve or deny the candidate online payment transaction based on the level of confidence;

generate one or more reason codes based on the authentication data, the transaction data, and the assurance level score, wherein each of the one or more reason codes represents a reason for the value of the assurance level score;

add the assurance level score and the one or more reason codes into the authorization request message, wherein subsequent to the adding, the authorization request message remains formatted according to the predefined communications standard for receipt by the authorizer computer device; and transmit, to the authorizer computer device over the payment processing interchange network, the authorization request message including the assurance level score and the one or more reason codes.

17. The computer-readable storage medium in accordance with claim 16, wherein the computer-executable instructions cause the at least one processor to:

generate an initial assurance score based on the authentication data; and transmit, to the merchant processor computer device, the initial assurance score.

18. The computer-readable storage medium in accordance with claim 16, wherein the authentication data includes one or more merchant reason codes that each represent a reason for a merchant fraud grading, and wherein when the authorization request message is transmitted to the authorizer computer device, the authorization request message further includes at least one of the one or more merchant reason codes.

19. The computer-readable storage medium in accordance with claim 16, wherein the computer-executable instructions cause the at least one processor to:

determine a cost of a false negative based on a cost of a historical series of previous transactions determined fraudulent and having data elements similar to data elements associated with the candidate online payment transaction, wherein the cost of the false negative represents an amount that will be lost if the candidate online payment transaction is scored as being fraudulent.

20. The computer-readable storage medium in accordance with claim 16, wherein the computer-executable instructions cause the at least one processor to:

determine a cost of a false positive based on a profitability of the candidate accountholder, wherein the cost of the false positive represents a likelihood that the candidate accountholder stops using a particular payment account when a genuine payment transaction associated with the particular payment account is declined.

* * * * *